United States Patent
Murakami et al.

(10) Patent No.: US 11,807,165 B2
(45) Date of Patent: Nov. 7, 2023

(54) AIRBAG MODULE

(71) Applicants: Autoliv Development AB, Vargarda (SE); Sho Murakami, Kanagawa (JP); Masaru Habu, Kanagawa (JP)

(72) Inventors: Sho Murakami, Kanagawa (JP); Masaru Habu, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/754,336

(22) PCT Filed: Sep. 28, 2020

(86) PCT No.: PCT/JP2020/036570
§ 371 (c)(1),
(2) Date: Mar. 30, 2022

(87) PCT Pub. No.: WO2021/065778
PCT Pub. Date: Apr. 8, 2021

(65) Prior Publication Data
US 2022/0340099 A1   Oct. 27, 2022

(30) Foreign Application Priority Data
Oct. 1, 2019 (JP) .................. 2019-181279

(51) Int. Cl.
*B60R 21/20* (2011.01)
*B60R 21/2334* (2011.01)
*B60R 21/231* (2011.01)

(52) U.S. Cl.
CPC .......... *B60R 21/20* (2013.01); *B60R 21/2334* (2013.01); *B60R 2021/23169* (2013.01)

(58) Field of Classification Search
CPC ................ B60R 21/2155; B60R 2021/2173
See application file for complete search history.

(56) References Cited

U.S. PATENT DOCUMENTS 5,234,229 A * 8/1993 Gordon ................. B60R 21/276
                                                280/736
5,306,042 A * 4/1994 Frank .................... B60R 21/216
                                                280/732

(Continued)

FOREIGN PATENT DOCUMENTS

CN    114007907 A *  2/2022  ........... B60R 21/203
DE      4445737 A1 *  6/1995  ........... B60R 21/045

(Continued)

OTHER PUBLICATIONS

CD-ROM of the specification and drawings annexed to the request of Japanese Utility Model Application No. 012241/1992 (Laid-open No. 072606/1993); (Mitsubishi Motors Corporation) Oct. 5, 1993(Oct. 5, 1993) paragraphs [0010]-[0022], fig. 1-5.

(Continued)

*Primary Examiner* — Nicole T Verley
(74) *Attorney, Agent, or Firm* — DICKINSON WRIGHT PLLC (57) ABSTRACT

A representative configuration of an airbag module including a folded or rolled airbag cushion, an inflator provided in the airbag cushion, and a case type housing for stowing the airbag cushion, wherein the housing is rectangular shaped in cross-sectional view and includes a first member forming at least one side wall of the rectangular shape, a second member that forms the remaining two or more side walls of the rectangular shape, and a rotational shaft connecting the first member and the second member enabling mutual relative rotation, and upon expansion and deployment of the airbag cushion, one of either the first member or second member rotates relative to the other around the rotational shaft causing the opening of an upper part of the case type housing to open up.

16 Claims, 7 Drawing Sheets

(56) References Cited

U.S. PATENT DOCUMENTS

| | | | | |
|---|---|---|---|---|
| 5,344,184 | A | * | 9/1994 | Keeler ................ B60R 21/2155 280/732 |
| 6,161,864 | A | * | 12/2000 | Heilig ................ B60R 21/2155 280/743.1 |
| 6,752,417 | B2 | | 6/2004 | Takimoto et al. |
| 7,393,012 | B2 | * | 7/2008 | Funakura .............. B60R 21/045 280/752 |
| 11,447,089 | B2 | * | 9/2022 | Deutschmann ..... B60R 21/2155 |
| 11,518,333 | B2 | * | 12/2022 | Song .................... B60R 21/216 |
| 2002/0171230 | A1 | | 11/2002 | Takimoto et al. |
| 2004/0004343 | A1 | * | 1/2004 | Pinsenschaum ...... B60R 21/216 280/728.3 |
| 2019/0047507 | A1 | | 2/2019 | Zischka et al. |
| 2021/0053525 | A1 | * | 2/2021 | Deutschmann ....... B60R 21/216 |

FOREIGN PATENT DOCUMENTS

| | | | | |
|---|---|---|---|---|
| DE | 29721644 U1 | * | 4/1998 | ......... B60R 21/2155 |
| DE | 29721681 U1 | * | 4/1998 | ......... B60R 21/2155 |
| DE | 10111597 A1 | * | 1/2003 | ......... B60R 21/2155 |
| DE | 10352564 A1 | | 6/2005 | |
| DE | 202019103552 U1 | * | 11/2020 | ........... B60R 21/203 |
| EP | 1059210 A2 | * | 12/2000 | ......... B60R 21/2155 |
| EP | 1357001 A2 | * | 10/2003 | ........... B60R 21/205 |
| EP | 1733930 A2 | * | 12/2006 | .......... B60R 21/206 |
| JP | 63-141851 A | | 6/1988 | |
| JP | H0616159 U | * | 7/1992 | |
| JP | H08239003 A | | 9/1996 | |
| JP | 11-235964 A | | 8/1999 | |
| JP | 2004-034965 A | | 2/2004 | |
| JP | 2005096661 A | | 4/2005 | |
| JP | 2007-203937 A | | 8/2007 | |
| JP | 2009-029167 A | | 2/2009 | |
| JP | 2010-208458 A | | 9/2010 | |
| JP | 2010202047 A | | 9/2010 | |
| WO | WO-9915371 A1 | * | 4/1999 | ............. B60R 21/20 |
| WO | WO-0114172 A1 | * | 3/2001 | ......... B60R 21/2155 |
| WO | WO-02064404 A1 | * | 8/2002 | ......... B60R 21/2155 |
| WO | WO-03018370 A1 | * | 3/2003 | ......... B60R 21/2155 |
| WO | WO-2021124674 A1 | * | 6/2021 | ............. B62J 27/20 |

OTHER PUBLICATIONS

First Office Action of CN202080063640, dated Apr. 7, 2023; English translation.

Search Report of CN202080063640, dated Apr. 3, 2023; English translation.

* cited by examiner

AIRBAG MODULE

CROSS-REFERENCE TO RELATED APPLICATIONS

This application is a 35 U.S.C. § 371 national phase of PCT International Application No. PCT/JP2020/036570, filed Sep. 28, 2020, which claims the benefit of priority under 35 U.S.C. § 119 to Japanese Patent Application No. 2019-181279, filed Oct. 1, 2019, the contents of which are incorporated herein by reference in its entirety.

TECHNICAL FIELD

The present invention relates to an airbag module provided with a case type housing for stowing an airbag cushion.

BACKGROUND

Airbag devices have generally become standard equipment in vehicles in recent years. An airbag device is a safety device which is operated in the event of an emergency such as a vehicle collision, retaining and protecting passengers utilizing an airbag cushion which expands and deploys based on gas pressure. Prior to expansion and deployment, the airbag cushion is folded or rolled into a small, stowed form for installation in various places in a vehicle.

For example, patent Document 1 (Japanese Unexamined Patent Application Publication No. 2007-203937) discloses a knee protection airbag device including an airbag that is folded and stowed on a lower surface side of a column cover covering a steering column and an inflator that supplies inflation gas to the airbag. In the knee protection airbag device of Patent Document 1, an airbag into which the expansion gas discharged from the inflator flows protrudes from the stowed site on the lower surface side of the column cover, and expands and deploys so as to cover the lower surface side of the column cover.

This enables protecting both knees of the driver.

SUMMARY

In an emergency, an airbag needs to rapidly expand and deploy. However, if the housing does not readily open, the expansion and deployment of the airbag will be hindered, and expanding and deploying an airbag at the desired timing will be difficult. Therefore, there has been a demand for the development of technology enabling housing to open more readily.

In light of these issues, an object of the present invention is to provide an airbag module where the housing opens readily during expansion and deployment of the airbag.

To resolve the issues described above, a representative configuration of an airbag module according to the present invention includes:
  a folded or rolled airbag cushion;
  an inflator provided in the airbag cushion; and
  a case type housing for stowing the airbag cushion, wherein the housing is rectangular shaped in cross-sectional view and includes:
    a first member forming at least one side wall of the rectangular shape;
    a second member that forms the remaining two or more side walls of the rectangular shape; and
    a rotational shaft connecting the first member and the second member enabling mutual relative rotation, and upon expansion and deployment of the airbag cushion, one of either the first member or second member rotates relative to the other around the rotational shaft causing the opening of an upper part of the case type housing to open up.

With the configuration described above, rotation of the first member with respect to the second member causes the opening on the upper side of the housing to open up. In other words, the opening of the housing readily opens during expansion and deployment of the airbag cushion. As the housing opens readily in this manner, speed of the airbag cushion deployment can be increased. This stabilizes deployment behavior and enables restraining the occupant more rapidly. Thus, occupant injury value can be reduced. In addition, the housing opening readily improves resistance of internal pressure reduction of the cushion during airbag cushion deployment. Therefore, the amount of cushion base material is anticipated to be reduced and the housing plate thickness is anticipated to be reduced enabling potential cost reduction.

The first member described above includes three side walls and the second member includes three side walls including the remaining side wall and two contiguous side walls on either side thereof and overlaps with the first member.

The first member described above includes two side walls with an L shaped cross-section and the second member includes the two remaining side walls with an L shaped cross-section.

The first member includes three side walls and the second member includes two side walls with an L shaped cross-section and includes the remaining side wall.

These configurations also enable obtaining the same effect as described above.

The housing described above may include a pin secured to one of the first member or second member and a bracket secured to the other of the first member or second member provided with a slot that enables the pin to slide. With this type of configuration, rotation of one of the first member or second member can be guided relative to the other, thus enabling stable operation. In addition, varying the length of the slot enables control of the discharge angle (discharge direction) of the airbag cushion during expansion and deployment as well as deployment amount of the airbag cushion.

Another configuration of an airbag module according to the present invention includes:
  a folded or rolled airbag cushion;
  an inflator provided in the airbag cushion; and
  a case type housing for stowing the airbag cushion, wherein the housing includes:
    a first member forming at least one side wall of the rectangular shape;
    a second member that forms the remaining two or more side walls of the rectangular shape; and
    a connecting member that connects the first member and the second member, and
    the connecting member has a bent portion separated from the first member or second member and upon expansion and deployment of the airbag cushion, extension of the bent portion of the connecting member separates one of the first member or second member from the other causing an opening on the upper side of the case type housing to open.

With this configuration, extension of the bent portion of the connecting member causes an opening of the upper part of the housing to open. In other words, the opening of the housing readily opens during expansion and deployment of the airbag cushion. Therefore, this configuration also enables achieving the effect described above.

The first member described above includes three side walls and the second member includes three side walls including the remaining side wall and two contiguous side walls on either side thereof and overlaps with the first member.

The first member described above includes two side walls with an L shaped cross-section and the second member includes the two remaining side walls with an L shaped cross-section.

The first member includes three side walls and the second member includes two side walls with an L shaped cross-section and includes the remaining side wall.

These configurations also enable obtaining the same effect as described above.

The bent portion of the connecting member described above may have a hat shape protruding in a direction away from the first member or second member. Thus, sufficient deformation can be ensured by the bent portion, enhancing the effect described above. In addition, varying the length of the bent portion of the connecting member enables control of the discharge angle (discharge direction) of the airbag cushion during expansion and deployment as well as deployment amount of the airbag cushion.

The present invention enables providing an airbag module with the housing readily capable of opening when the airbag expands and deploys.

DETAILED DESCRIPTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Embodiment 1

Figure 1A:
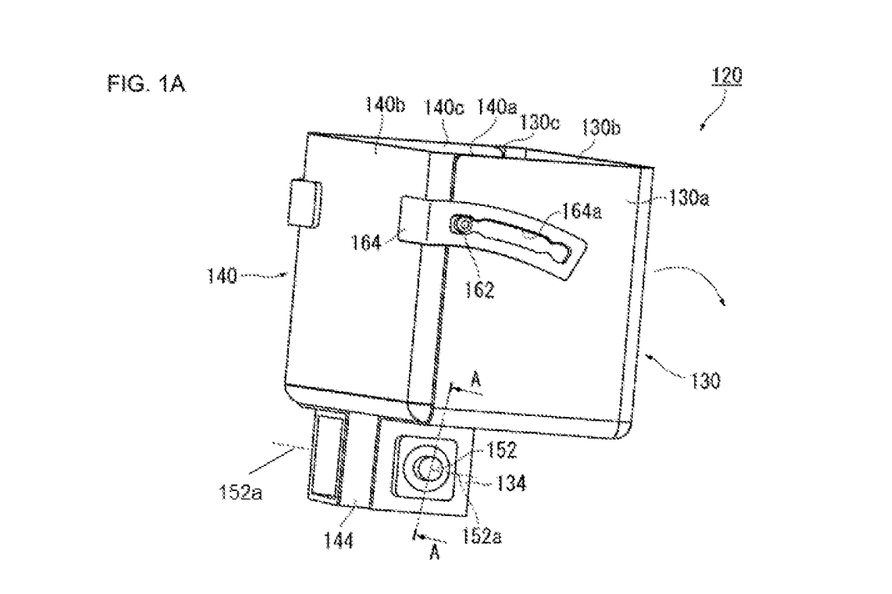
FIG. 1 is a perspective view of an airbag module according to embodiment 1 of the present invention.
Figure 1B:
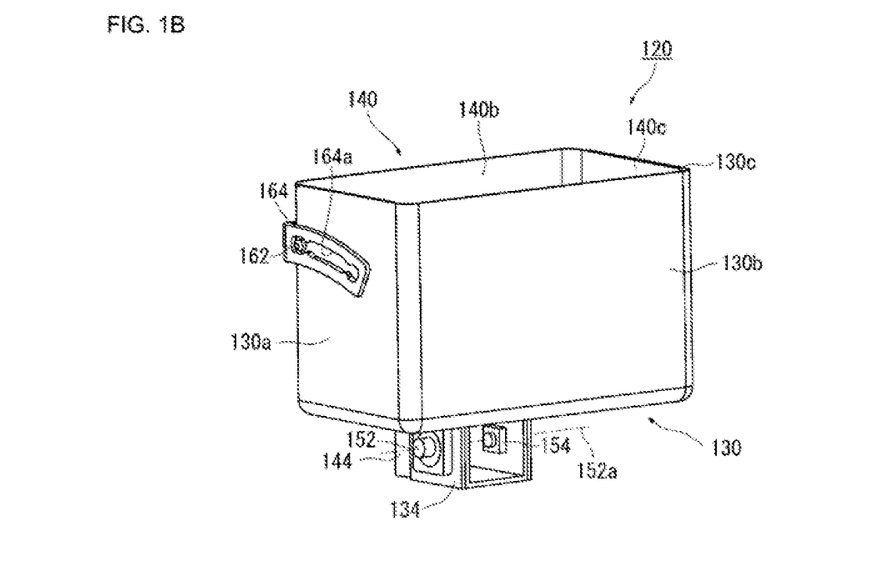
Figure 2:
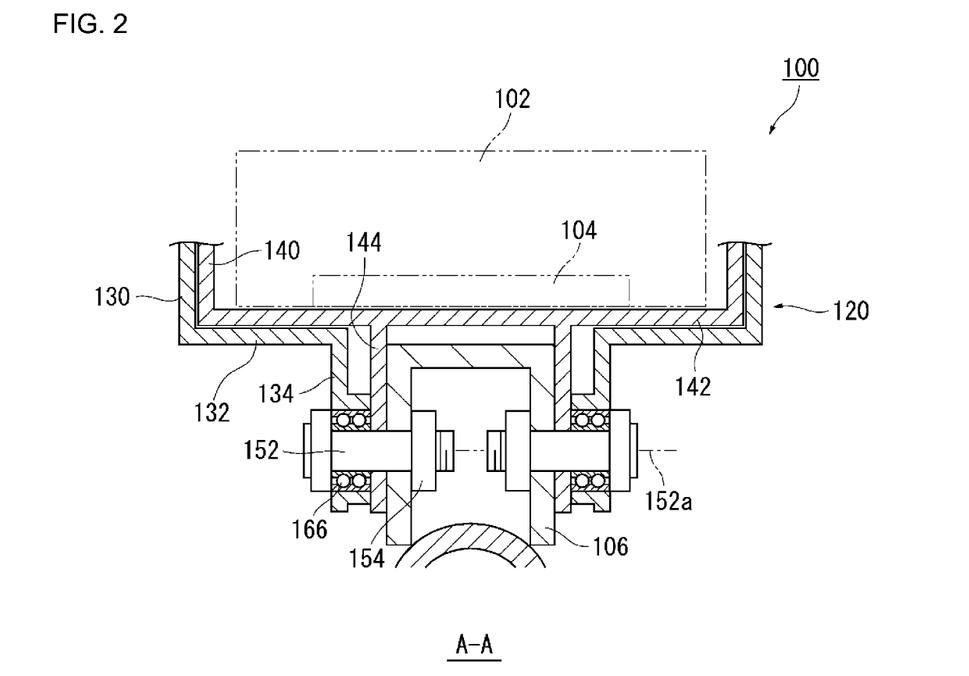
FIG. 2 is a schematic cross-sectional view of the leg part of FIG. 1(*a*) taken along the line A-A.

FIG. 1 is a perspective view of an airbag module 100 according to embodiment 1 of the present invention. FIG. 1(*a*) is an overall perspective view of the housing 120 of the airbag module 100, and FIG. 1(*b*) is a perspective view of the housing 120 of FIG. 1(*a*) observed from a different direction. FIG. 2 is a schematic cross-sectional view of the leg part of FIG. 1(*a*) taken along the line A-A. For ease of understanding, FIG. 2 illustrates an airbag cushion 102 and an inflator 104 not shown in FIG. 1(*a*) as dashed lines.

Note that the airbag module 100 of the present embodiment is assumed to be used as a knee airbag device that protects the knee portion of the passenger. However, the airbag module 100 of the present embodiment is not limited thereto, and can be used as an airbag for a motorcycle. In addition, the airbag module 100 of the present embodiment may also be used as an airbag to protect the occupant's head and chest.

As illustrated in FIG. 2, the airbag module 100 of embodiment 1 includes an airbag cushion 102, an inflator 104, and a case type housing 120. The inflator 104 is provided in the airbag cushion 102. The airbag cushion 102 is stowed in the housing 120 in a folded or rolled up state.

As illustrated in FIG. 1(*a*) and FIG. 1(*b*), the housing 120 is rectangular and has a first member 130 and a second member 140. The first member 130 has three side walls 130*a*, 130*b*, and 130*c*. The second member 140 includes three side walls 140*a*, 140*b*, and 140*c* that are opposite the first member 130 and overlap inside the first member 130.

As illustrated in FIG. 2, leg parts 134 and 144 extend from bottom wall 132 and bottom wall 142 respectively of the first member 130 and the second member 140. The housing 120 is secured with the leg parts 134 and 144 to the frame 106 by a bolt 152 and a nut 154. In the airbag module 100 of the present embodiment, the bolt 152 connects the first member 130 and the second member 140. Therefore, when the first member 130 and second member 140 rotate relative to one another, a rotational shaft 152*a* is the central axis of the bolt 152.

As illustrated in FIG. 1, in embodiment 1, the housing 110 is provided with a pin 162 and a bracket 164 as a member for guiding the rotation of the first member 130 and the second member 140. The pin 162 is secured to the first member 130. The bracket 164 is arc-shaped and is secured to the second member 140. An arc-shaped slot 164*a* in which the pin 162 is slidably inserted is formed in the bracket 164.

Figure 3A:
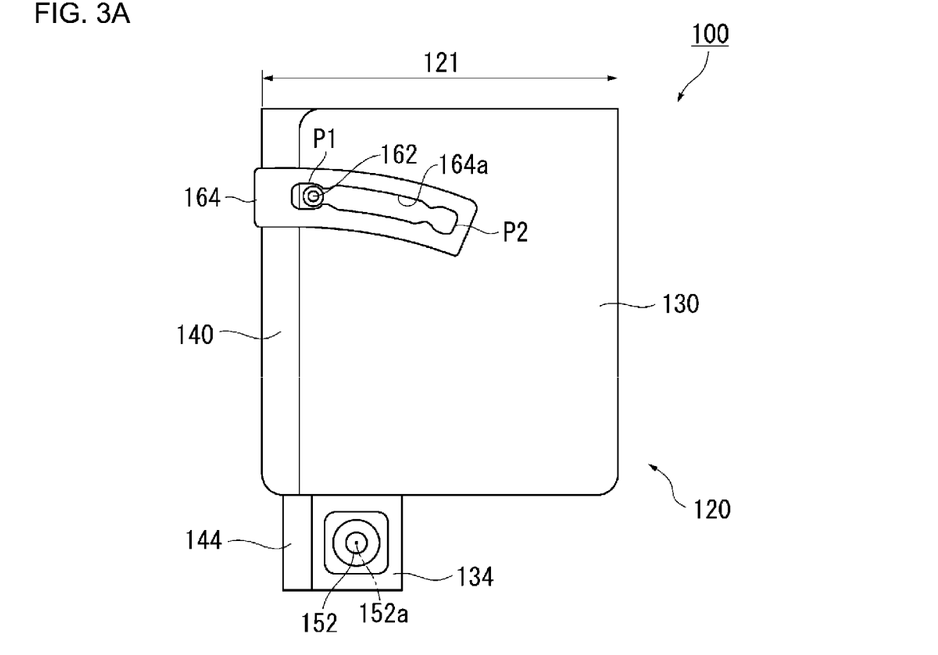
FIG. 3 is a diagram illustrating the behavior of the housing of FIG. 1 during expansion and deployment of the airbag cushion.
Figure 3B:
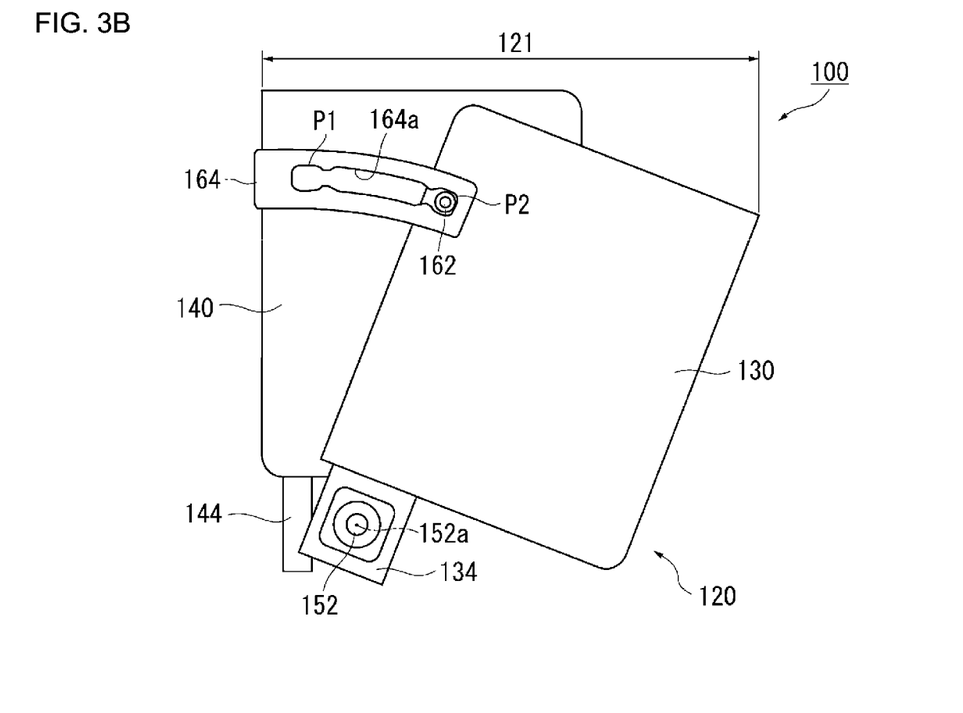

FIG. 3 is a diagram describing the behavior of the housing of FIG. 1 during expansion and deployment of the airbag cushion 102. Prior to expansion and deployment of the airbag cushion 102, the pin 162 is positioned at start point P1 of the frame 106 slot 164*a* as illustrated in FIG. 3(*a*). Furthermore, when the airbag cushion 102 expands and deploys, the first member 130 is pushed out by the pressure thereof. Thus, the pin 162 moves in the slot 164*a* of the bracket 164 and the first member 130 rotates relative to the second member 140 around a rotational axis 152 (central axis of the bolt 152). Furthermore, as illustrated in FIG. 3(*b*), the pin 162 moves to the end point P2 of the slot 164*a* and the opening 121 of the upper side of the case type housing 120 opens up.

With the configuration described above, rotation of the first member 130 with respect to the second member 140 causes the opening on the upper side of the housing 120 to open up. In other words, the opening of the housing 120 readily opens during expansion and deployment of the airbag cushion 102. As the housing 120 opens readily in this manner, speed of the airbag cushion deployment can be increased. This stabilizes deployment behavior and enables restraining the occupant more rapidly. Thus, occupant injury value can be reduced. In addition, the housing 120 opening readily improves resistance of internal pressure reduction of the cushion during airbag cushion 102 deployment. Therefore, the amount of cushion base material is anticipated to be reduced and the housing 120 plate thickness is anticipated to be reduced enabling potential cost reduction.

Also, with the configuration described above, the pin 162 and the bracket 164 are provided to enable guiding the rotation of the first member 130 relative to the second member 140 in the housing 120. Thus, stable operation is feasible and the desired behavior can be reliably obtained.

Further in the present embodiment, as illustrated in FIG. 2, the housing 120 includes bearings 166 that are connected to the bolt 152 provided as a rotation axis 152a. Therefore, friction of the bolt 152 when the first member 130 rotates relative to the second member 140 can be reduced. Therefore, since the first member 130 and the second member 140 rotate more smoothly, the effects described above can be improved.

FIG. 4 is a diagram illustrating the variation of the housing of FIG. 1. As illustrated in FIG. 4(a), the housing 120 of the embodiment described above is formed from a combination of a first member 130 including three side walls 130a, 130b, and 130c and a second member 140 including three side walls 140a, 140b, and 140c.

Figure 4A:
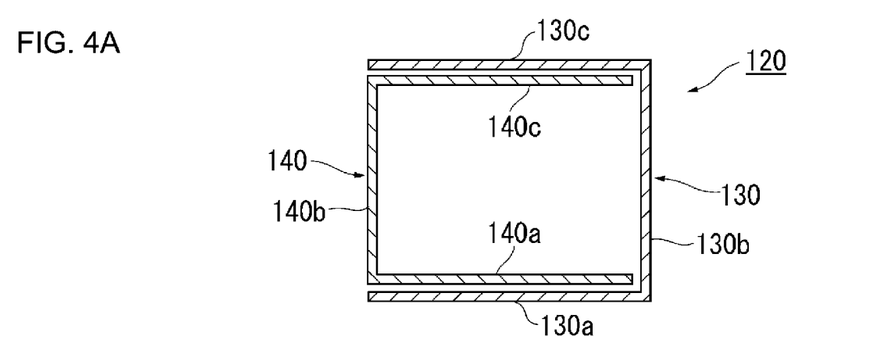
FIG. 4 is a diagram illustrating a variation of the housing of FIG. 1.
Figure 4B:
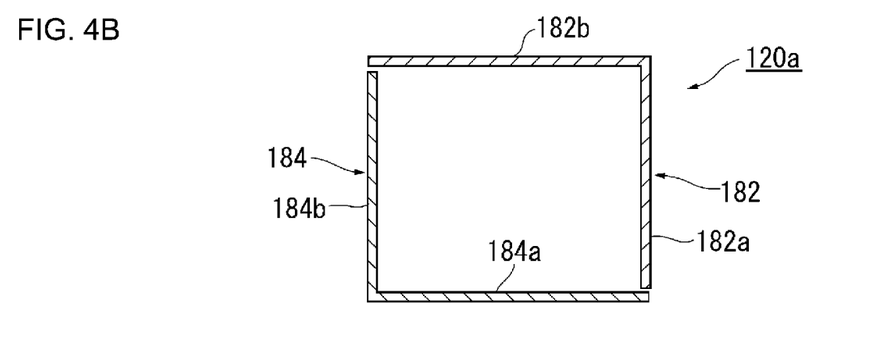
Figure 4C:
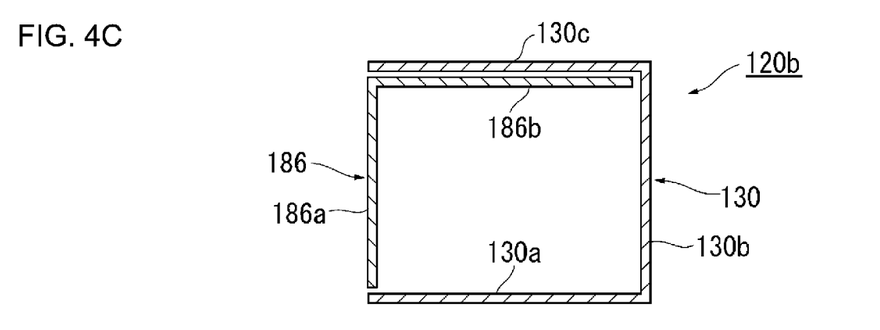
Figure 4D:
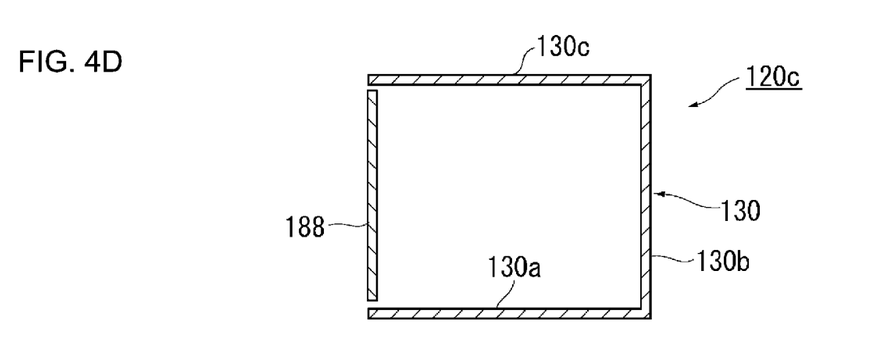

The housing 120 illustrated in FIG. 4(b) is formed from a combination of a first member 182 having an L shaped cross section and including two side walls 182a and 182b and a second member 184 having an L shaped cross section and including the remaining side wall 184a and side wall 184b. The housing 120b illustrated in FIG. 4(c) is formed from a combination of a first member 130 including three side walls 130a, 130b, and 130c and a second member 186 having an L shaped cross section and including two side walls 186a and 186b. The housing 120c illustrated in FIG. 4(d) is formed from a combination of the first member 130 including three side walls 130a, 130b, and 130c and a second member 188 including the remaining side wall.

In this manner, the cross section of the first member and the second member does not necessarily have to be in the shape of a U. If four side walls surrounding the airbag cushion 102 can be formed, members with a shape other than an L shape can be used to the same effect as that described above.

Embodiment 2

Figure 5A:
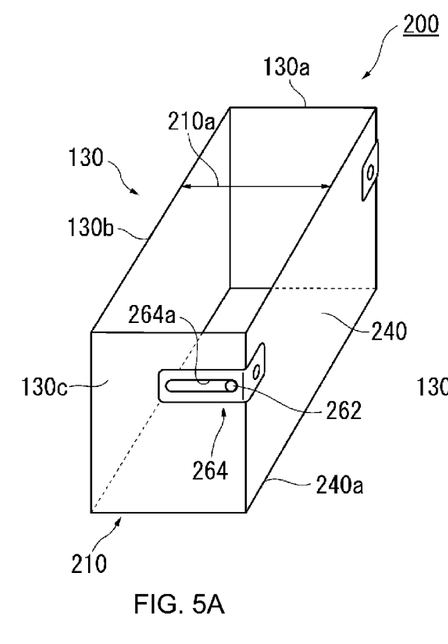
FIG. 5 is a perspective view of an airbag module according to embodiment 2 of the present invention.
Figure 5B:
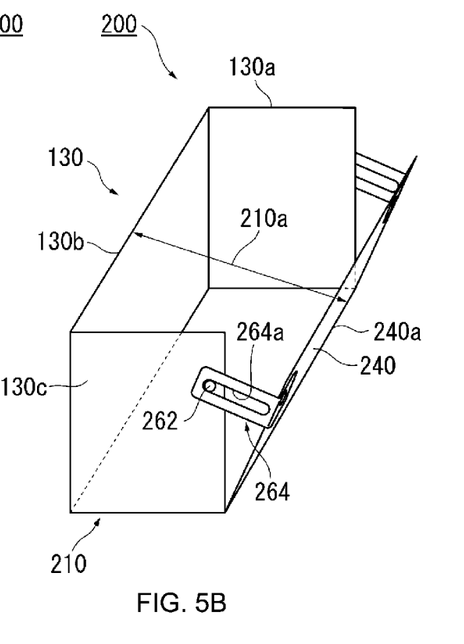

FIG. 5 is a perspective view of the airbag module 200 according to embodiment 2 of the present invention and is an overall perspective view of a housing 210 of an airbag module 200. Note, the airbag cushion 102 and inflator 104 (see FIG. 2) are not shown in FIG. 5. In addition, the bolt 152 (FIG. 1) that provides the rotational shaft 152a is not shown.

The housing 210 of the airbag module 200 illustrated in FIG. 5(a) is formed of a first member 130 having three side walls 130a, 130b, and 130c and a second member 240 including the remaining side wall. The housing 210 is provided with a pin 262 that is a member for guiding rotation and an L shaped bracket 264. The pin 262 is secured to the first member 130. The bracket 264 has a slot 264a for the pin 262 to slide in and is secured to the second member 240. Differing from the slot 164a of embodiment 1 illustrated in FIG. 3, the slot 264a is linear.

With the configuration described above, the second member 240 is pushed from the pressure when the airbag cushion 102 expands and deploys. Thus, the pin 262 slides in the slot 264a of the bracket 264 and the second member 240 rotates relative to the first member 130 with a short side 240a of the second member 240 as a rotation axis. Furthermore, as illustrated in FIG. 5(b), an opening 210a on the upper side of the case type housing 210 opens up. Therefore, the airbag module 200 of embodiment 2 can achieve the same effect as the airbag module 100 of embodiment 1.

Note, the pin 262 slides in an arc-shaped path in the linear slot 264a so the slot 264a is preferably provided with sufficient width to prevent interference with the pin 262.

Embodiment 3

Figure 6A:
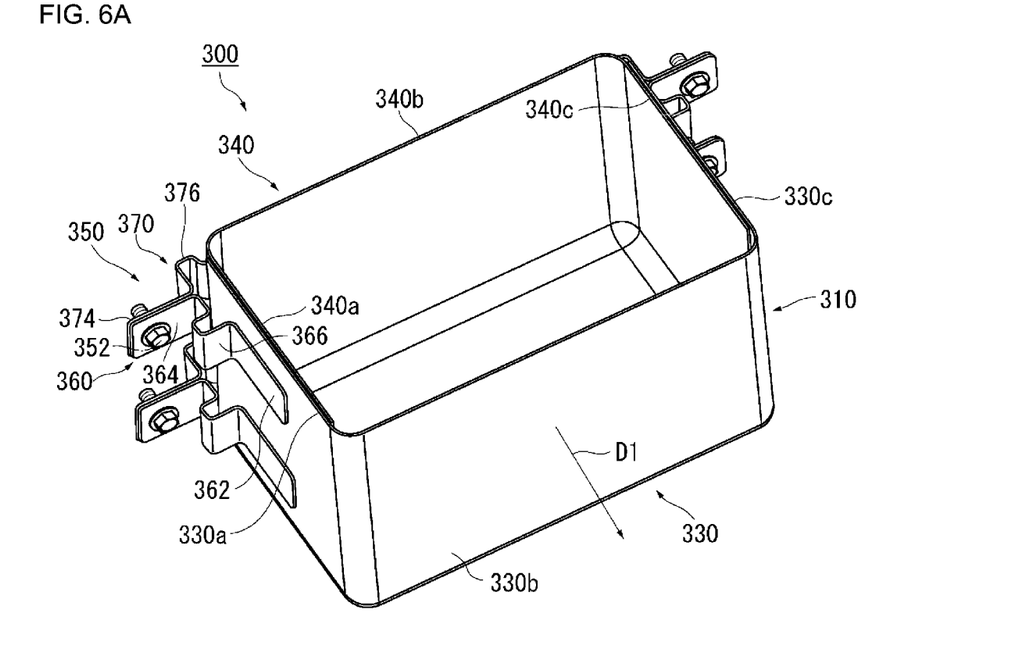
FIG. 6 is a perspective view of an airbag module according to embodiment 3 of the present invention.
Figure 6B:
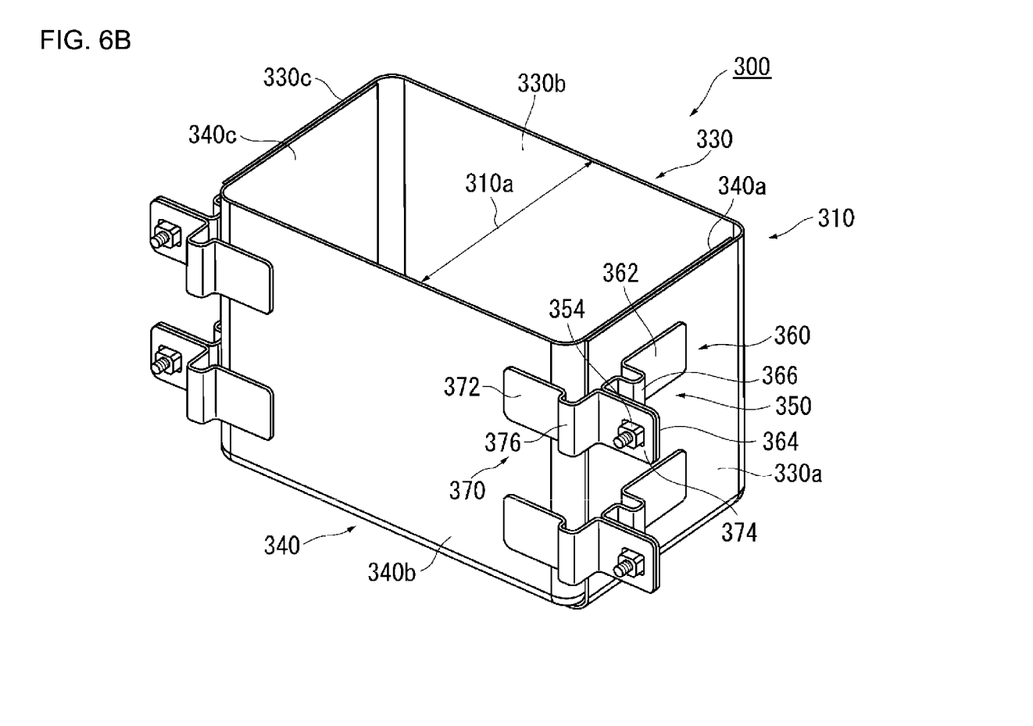
Figure 7:
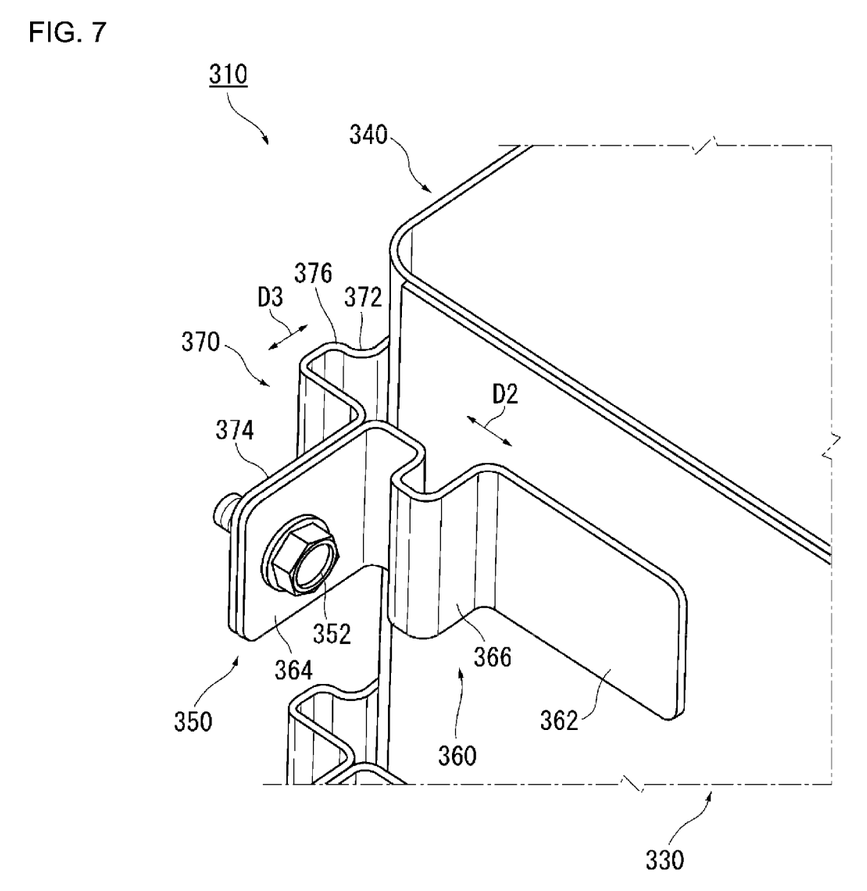
FIG. 7 is an expanded perspective view of the vicinity of the connecting member of FIG. 6(*a*).

FIG. 6 is a perspective view of an airbag module 300 according to embodiment 3 of the present invention. FIG. 6 (a) is an overall perspective view of the housing 310 of the airbag module 300, and FIG. 6 (b) is a perspective view of the housing 310 of FIG. 6(a) observed from a different direction. FIG. 7 is an expanded perspective view of the vicinity of the connecting member 350.

As illustrated in FIG. 6(a) and FIG. 6(b), the housing 310 of the airbag module 300 of embodiment 3 includes a first member 330 and a second member 340. The first member 330 has three side walls 330a, 330b, and 330c. The second member 340 has three side walls, side wall 340a, side wall 340b, and side wall 340c that are arranged inside the first member 330. The first member 330 and second member 340 are connected by the connecting member 350.

As illustrated in FIG. 6(b) and FIG. 7, the connecting member 350 includes a first connecting member 360 and a second connecting member 370. The first connecting member 360 includes a joint part 362, a connecting part 364, and a bending part 366. The joint part 362 is the location for joining with the first member 330 and the connecting part 364 is the location for connecting to the second connecting member 370. The bending part 366 that is a bending location is formed between the joint part 362 and the connecting part 364.

The second connecting member 370 includes a joint part 372, a connecting part 374, and a bending part 376. The joint part 372 is the location for joining with the second member 340 and the connecting part 374 is the location for connecting to the first connecting member 360. A bending part 376 that is the bending portion that is separated from the first member or the second member is formed between the joint part 372 and the connecting part 374.

The connecting part 364 of the first connecting member 360 and connecting part 374 of the second connecting member 370 are secured by a bolt 352 illustrated in FIG. 7 and a nut 354 illustrated in FIG. 6(b). Thus, the first member 330 and second member 340 are connected by means of the first connecting member 360 and second connecting member 370.

With the configuration described above, upon expansion and deployment of the airbag cushion 102, the pressure thereof causes the bending parts 366 and 376 that are the bent portions of the connecting member 350 to extend in the directions of the arrows D2 and D3 illustrated in FIG. 7. Thus, the first member 330 separates from the second member 340 in the direction of the arrow D1 illustrated in FIG. 6(a) causing an opening 310a (see FIG. 6(b)) of the upper part of the case type housing 310 to open. Therefore, the airbag module 300 of embodiment 3 can achieve the same effect as the airbag module 100 of embodiment 1.

In particular, in the present embodiment, the bending parts 366 and 376 that are bent portions have a hat shape protruding in a direction away from the housing 310. Thus, sufficient deformation can be ensured by the bending parts 366 and 376, enhancing the effect described above.

Note, in the present embodiment, a configuration using two connecting members (first connecting member 360 and second connecting member 370) was illustrated but the configuration is not limited to this. For example, if the connecting part 364 of the first connecting member 360 is connected to the second member 340, the effect described above can be achieved without requiring the second connecting member 370.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

The present invention can be used as an airbag module for a knee airbag or an airbag for a motorcycle (bike).

The invention claimed is:

1. An airbag module, comprising:
a folded or rolled airbag cushion;
an inflator provided in the airbag cushion; and
a case type housing for stowing the airbag cushion, wherein
the housing is rectangular shaped in cross-sectional view and includes:
a first member forming at least one side wall of the rectangular shape;
a second member that forms the remaining two or more side walls of the rectangular shape; and
a rotational shaft connecting the first member and the second member enabling mutual relative rotation,
wherein, prior to expansion and deployment of the airbag cushion, the housing is formed with an opening in an upper side of the housing to deploy the airbag cushion; and
wherein, upon the expansion and deployment of the airbag cushion, one of either a first member or second member rotates relative to the other around the rotational shaft such that a size of the opening of the case type housing is increased.

2. The airbag module according to claim 1, wherein the first member includes three side walls and the second member includes three side walls including the remaining side wall and two contiguous side walls on either side thereof and overlaps with the first member.

3. The airbag module according to claim 2, wherein the housing includes:
a pin secured to a first of the first member or the second member; and
a bracket secured to a second of the first member or second member provided with a slot enabling sliding of the pin.

4. The airbag module according to claim 1, wherein the first member includes two side walls with an L shaped cross-section and the second member includes the two remaining side walls with an L shaped cross-section.

5. The airbag module according to claim 4, wherein the housing includes:
a pin secured to a first of the first member or the second member; and
a bracket secured to a second of the first member or second member provided with a slot enabling sliding of the pin.

6. The airbag module according to claim 1, wherein the first member includes three side walls and the second member includes two contiguous side walls with an L shaped cross-section including the remaining side wall.

7. The airbag module according to claim 6, wherein the housing includes:
a pin secured to a first of the first member or the second member; and
a bracket secured to a second of the first member or second member provided with a slot enabling sliding of the pin.

8. The airbag module according to claim 1, wherein the housing includes:
a pin secured to a first of the first member or the second member; and
a bracket secured to a second of the first member or second member provided with a slot enabling sliding of the pin.

9. An airbag module, comprising:
a folded or rolled airbag cushion;
an inflator provided in the airbag cushion; and
a case type housing for stowing the airbag cushion, wherein
the housing includes:
a first member forming at least one side wall of the rectangular shape;
a second member that forms the remaining two or more side walls of the rectangular shape; and
a connecting member that connects the first member and the second member, and
the connecting member has a bent portion separated from the first member or second member and upon expansion and deployment of the airbag cushion, extension of the bent portion of the connecting member separates one of the first member or second member from the other causing an opening on the upper side of the case type housing to open.

10. The airbag module according to claim 9, wherein the first member includes three side walls and the second member includes three side walls including the remaining side wall and two contiguous side walls on either side thereof and overlaps with the first member.

11. The airbag module according to claim 10, wherein the bent portion of the connecting member has a hat shape protruding in a direction away from the first member or second member.

12. The airbag module according to claim 9, wherein the first member includes two side walls with an L shaped cross-section and the second member includes the two remaining side walls with an L shaped cross-section.

13. The airbag module according to claim 12, wherein the bent portion of the connecting member has a hat shape protruding in a direction away from the first member or second member.

14. The airbag module according to claim 9, wherein the first member includes three side walls and the second member includes two contiguous side walls with an L shaped cross-section including the remaining side wall.

15. The airbag module according to claim 14, wherein the bent portion of the connecting member has a hat shape protruding in a direction away from the first member or second member.

16. The airbag module according to claim 9, wherein the bent portion of the connecting member has a hat shape protruding in a direction away from the first member or second member.

* * * * *